June 27, 1961         O. R. BATES ET AL         2,990,134
APPARATUS FOR STORING AND GUIDING SUBMARINE CABLE
Filed Sept. 5, 1956         2 Sheets-Sheet 1
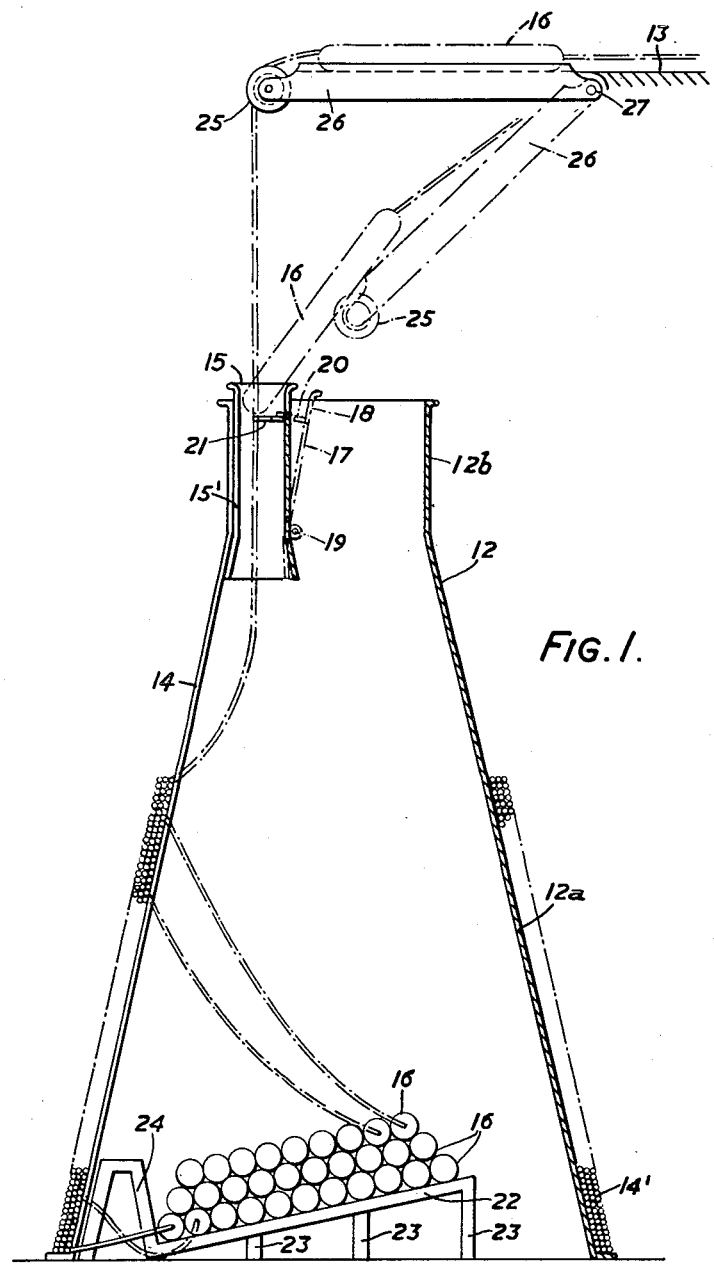
FIG. I.
INVENTORS
O. R. Bates and
R. J. Ashby
BY John A. Seifert
ATTORNEY

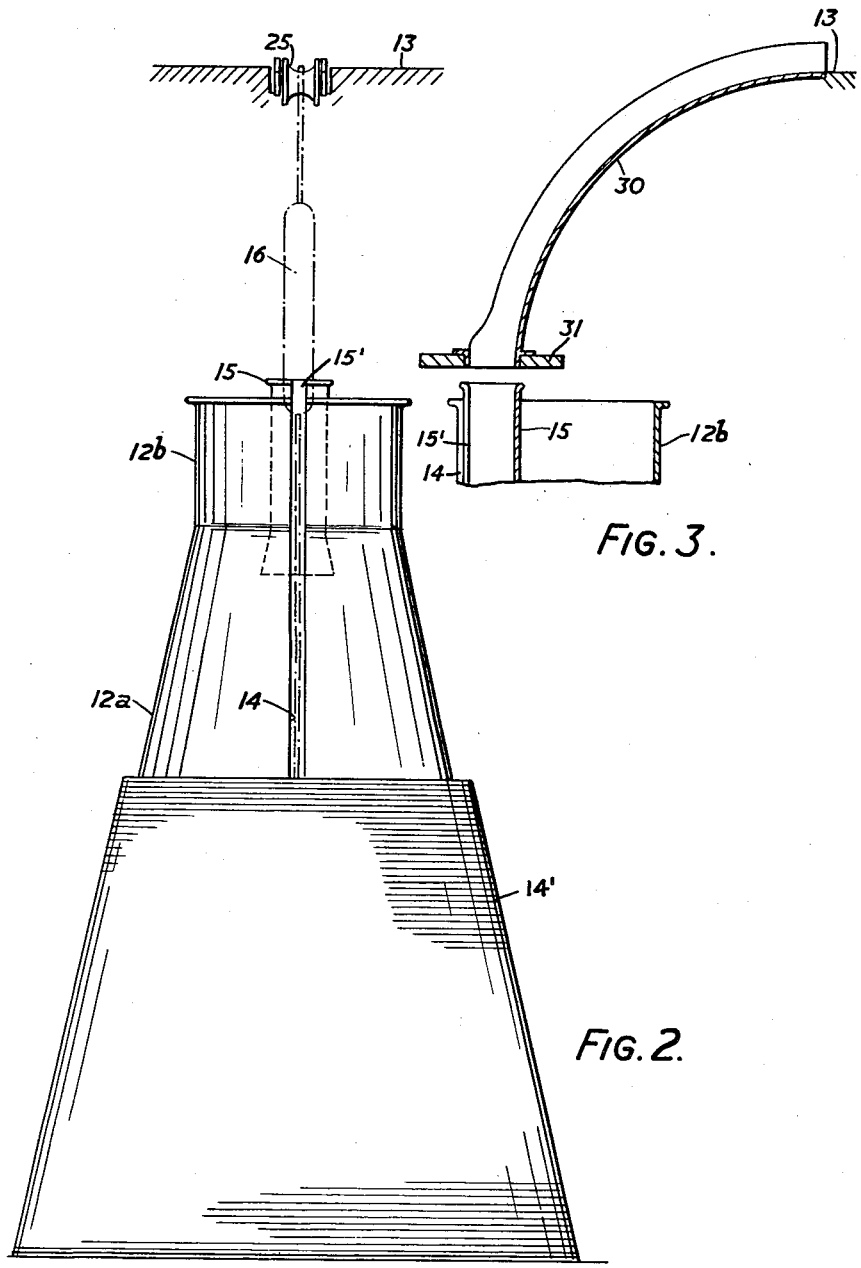

United States Patent Office 2,990,134
Patented June 27, 1961

2,990,134
APPARATUS FOR STORING AND GUIDING SUBMARINE CABLE
Oswald Robert Bates, North Harrow, and Ronald Joseph Ashby, Orpington, England, assignors to Johnson & Phillips Limited, and Her Majesty's Postmaster General, both of London, England
Filed Sept. 5, 1956, Ser. No. 608,084
Claims priority, application Great Britain Sept. 3, 1956
8 Claims. (Cl. 242—128)

This invention relates to methods and apparatus employed on a cable-laying ship and elsewhere in connection with the storage of submarine cables.

In accordance with present practice a submarine cable which is to be payed out over the stern or bow of a cable laying ship is stored in one or a plurality of storage tanks or holds each of which is of vertical cylindrical form and has coaxially within it an upright column of truncated conical form usually known as the cone. The cable is coiled in the tank around the cone in a series of layers each of which is wound from the outer to the inner turn, and the cable is drawn upwards from the tank through an eye which is coaxially above the cone, and passes thence over a sheave and towards the stern or bow of the ship as the case may be.

In modern practice it is usual to connect repeaters in the line of cable at intervals of say fifty miles. Such repeaters are elongated cylindrical objects which may be about ten feet in length and nearly half a ton in weight, and they are connected coaxially in the line of cable.

When repeaters are employed they have previously been stowed on the deck around the cable tank hatch in the following procedure: If the first 50 miles or so of cable has been coiled in the tank around the cone, the end of the cable, which is connected to one end of the repeater, is brought to deck level where the repeater is stowed, while the other end of the repeater, to which further cable is connected, is taken back to the tank where a further 50 miles of cable can be coiled. This method is repeated until the cable tank is filled to capacity. This system of stowage has many disadvantages, namely the repeaters, plus the large bends of the cable, take up too much deck space and entail a considerable amount of manhandling. Also the repeaters may be subjected to rough usage. Also a repeater may sometimes become entangled with the cable. The present invention has for an object the provision of means whereby these and other disadvantages may be obviated.

Broadly, in accordance with the present invention, the repeaters apertaining to the cable stored round the cone are held within the cone, provision being made for the cable to pass from the exterior of the cone to the repeaters within the cone. Thus, the present invention resides in apparatus for storing cable having repeaters at intervals therein, which apparatus comprises a hollow cone around the exterior of which the cable is coiled and which has a slot in the wall therein extending to the top thereof, the cone being adapted to or containing means to store the repeaters of the stored cables with the repeaters located within the cone. The repeaters are preferably supported within the cone on an inclined plane having an upstanding abutment at the lower end, the repeaters being placed in layers on the inclined plane. During paying out of the cable, the cable is uncoiled from the drum until a repeater is reached; the repeater is then lifted by the cable vertically up the cone, the stop in the cone wall permitting this to be effected without fouling the cable.

It is to be understood that the term "cone" as used in this specification and the appendent claims is not restricted to a body having a truly conical wall. The cone which usually has a frusto-conical wall which may be surmounted by a cylindrical bore. One the other hand, other convergent surfaces may be employed.

The invention will be more readily understood by way of example from the following description of cable storage means in accordance therewith, reference being made to the accompanying drawings in which:

FIGURE 1 is an axial section through the apparatus,
FIGURE 2 is an end view at right angles to the section of FIGURE 1, and
FIGURE 3 is a sectional view showing a modification of the arm guide structure.

Referring to FIGURES 1 and 2, the cone is illustrated at 12 and has a frusto-conical wall 12a surmounted by a cylindrical wall 12b. The cone is located in the storage hold of a cable-laying ship, the laying deck of which is indicated at 13. The cone 12 is hollow and has a vertical slot 14 in its wall extending to the top of the wall. Located in the cylindrical wall 12b is a guide tube 15 which has a diameter such as to permit the easy passage of repeaters 16 through it. The guide tube 15 has a non-return latch 17 in the form of an arm 18 pivoted at 19 and carrying an abutment 20 extending through a hole in the guide 15. The abutment 20 is urged into the interior of the guide tube 15 by a spring (not shown) and when located therein as indicated at 21, it prevents the backward or downward movement of a repeater 16 which has been raised above the abutment.

Within the cone 12 is located an inclined platform 22 supported on legs 23 and having an upstanding abutment 24 at the lower end.

When the cable is stored in the hold, it is coiled about the exterior of the drum 12 as indicated at 14' until a repeater 16 is reached. This repeater is fed into the interior of the cone, the cable from its two ends being fed through the slot 14. This repeater is laid at the bottom of the inclined platform 22 and coiling of the cable about the cone is continued until the next repeater is reached. This is laid on the platform 22 and this process is continued, the repeaters 16 being arranged in layers as indicated in FIGURE 1.

When the cable is to be laid from the cable laying ship, or otherwise removed from storage, the cable is drawn off the drum over the sheave 25 located immediately above the guide tube 15. When the repeater 16 which was stored last is reached it is drawn up from the platform 22 by the cable and passes through the guide tube 15, the guide tube having a slot 15' in its wall aligned with the slot 14 of the cone so as to enable the cable to pass therethrough. During the output motion of the repeater through the guide tube 15, the repeater forces aside the latch 17. When the repeater has passed the abutment 20, the spring forces the abutment into the tube 15 behind the repeater so that if the tension is by accident or design removed from the cable, the repeater will not suddenly fall down the interior of the cone to the damage of itself and anyone working within the cone.

As will be understood, the repeaters are drawn upwards through the cone in a vertical disposition but it is necessary to turn them into a horizontal position to pass along the laying deck 13. The repeaters cannot pass over the sheave 25 in the position shown in FIGURE 1 because the cable attached to the repeater will be twisted through too severe an angle where it joins the repeater and there is danger that damage may be occurred. For this reason, the special equipment illustrated in the drawings is provided.

This equipment is, as shown in FIGURES 1 and 2, an arm 26 hinged to the deck at 27 and carrying the sheave 25 at its free end. The arm 26 can be lowerd to the position shown in chain line in FIGURE 1, in which it lies adjacent the top of the cone 12. The top of the arm 26 is trough-like so that the repeaters can lie on the top of the arm and be guided along its length. In operation, the arm 26 is lowered to the position shown in chain line when a repeater 16 is about to be drawn out of the cone. The repeater is then pulled over the sheave 25 and on top of the arm 26 without having to turn through a large angle. The result is that the connecting part of the cable is not severely twisted. Once the repeater is lying on the arm 26, the arm is raised to the position shown in full line in FIGURE 1 and the repeater is then drawn off along the laying deck 13.

In an alternative form of the equipment for guiding the repeaters from the vertical position to the horizontal position, a guide trough 30, smoothly curved through a right angle, is provided as shown diagrammatically in FIGURE 3. The bottom of the trough 30 is located immediately over the top of the guide tube 15 so that the repeaters can be drawn smoothly from the guide tube onto the guide surface of the trough 30. The upper end of the trough is aligned with the laying deck 13. To avoid damage to the repeater, and especially to the junction between the cable and the repeater, the curve of the trough must be very small and the radius of curvature should not be less than 20 feet for a repeater of 10 foot length. The guide trough 30 is mounted at its lower end on a support 31 through a rotating joint permitting the trough to rotate about a vertical axis substantially coaxial with the guide tube 15.

Alternative arrangements for the storage of the repeaters within the cone are possible. Thus the cone may have opposite slots in its wall and the repeaters may be laid horizontally one above the other in these slots in order that the repeaters may be level with the surface of the cable coiled about the cone, spacers may be interposed between the repeaters. Alternatively, the repeaters may be located within the slots so that they are tilted upwards and do not extend outwardly of the slots. This method facilitates the initial raising of the repeaters from their stored position.

Again, the repeaters may be arranged within the cone in an arcuate or semi-circular roll (as seen in plan) close to the wall of the cone on one side of the slot or slots, all of the repeaters being more or less upright with their leading ends uppermost and all of them at the same level. The repeaters, near their ends, may be supported in holes in a rack from which they can be drawn vertically, and at their lower ends they may rest on another rack.

In all the described arrangements, the repeaters may be manhandled immediately prior to or during the initial application of tension to them through the cable. This reduces the risk of the connections between the cable and the repeaters becoming damaged.

What is claimed is:

1. Apparatus for storing a submarine cable having repeaters at intervals therein, said apparatus comprising a hollow cone of a size to contain a plurality of repeaters and to have many miles of submarine cable coiled around the outside thereof, said cone having its upper end open and a slot in the wall of the cone opening at said open end of the cone, and an inclined platform within the cone having an abutment at the lower end whereby the repeaters are supported in inclining layers and the cable is coiled around the exterior of the cone with portions of the cable adjoining the ends of the repeaters within the cone passing through the slot.

2. In combination, a hollow cone having its upper end open, and having a slot in its wall breaking out at said open upper end, a length of submarine cable, a plurality of solid objects connected at intervals in said cable, said cable being coiled around the exterior of said cone with the solid objects stored inside said cone and portions of said cable adjoining said solid objects passing through said slot.

3. Apparatus for storing a cable having repeaters at intervals therein, said apparatus comprising a hollow cone having a slot in the wall of the cone extending to the top of the cone, means to store the repeaters within the cone, whereby the cable is coiled around the exterior of the cone with portions of the cable adjoining the ends of the repeaters within the cone passing through the slot, a guide at the upper end portion of the cone and having a slot to guide the repeaters out of the upper end of the cone with the cable passing through the slot in the guide.

4. Apparatus for storing a cable according to claim 3, a non-return latch mounted in the guide and adapted to prevent a repeater which has passed the latch from falling back into the cone.

5. Apparatus for storing a cable having repeaters at intervals therein, said apparatus comprising a hollow cone having a slot in the wall of the cone extending to the top of the cone, means to store the repeaters within the cone, whereby the cable is coiled around the exterior of the cone with portions of the cable adjoining the ends of the repeaters within the cone passing through the slot, and a curved guide channel mounted above the top of the cone and having a large radius of curvature relative to the length of a repeater for guiding the repeaters from a vertical position in which they are initially lifted up the cone to a horizontal position.

6. Apparatus for storing a cable according to claim 5, wherein the guide channel is rotatably mounted to rotate about a substantially vertical axis.

7. Apparatus for storing a cable having repeaters at intervals therein, said apparatus comprising a hollow cone having a slot in the wall of the cone extending to the top of the cone, means to store the repeaters within the cone, whereby the cable is coiled around the exterior of the cone with portions of the cable adjoining the ends of the repeaters within the cone passing through the slot, an arm pivoted at one end in a plane above the upper end of the cone, and a sheave mounted at the opposite end of the arm for guiding the cable from a vertical plane to a horizontal plane and adapted to be lowered toward the upper end of the cone by the pivotal adjustment of the arm to facilitate movement of the repeaters over the sheave onto the arm.

8. Apparatus for storing a cable according to claim 7, wherein the arm is channeled for guiding the repeaters along the arm.

References Cited in the file of this patent

UNITED STATES PATENTS

| | | |
|---|---|---|
| 139,427 | Seymour | May 27, 1873 |
| 372,958 | Bradley et al. | Nov. 8, 1887 |
| 1,561,844 | Gipson | Nov. 17, 1925 |
| 1,703,777 | Pernot | Feb. 26, 1929 |
| 1,815,532 | Vesey | July 21, 1931 |
| 2,142,440 | Friedrichs | Jan. 3, 1939 |
| 2,275,545 | Miller | Mar. 10, 1942 |
| 2,499,130 | Chase | Feb. 28, 1950 |
| 2,847,172 | Solkield | Aug. 12, 1958 |